(12) United States Patent
Gonen (10) Patent No.: US 8,977,116 B2
(45) Date of Patent: Mar. 10, 2015

(54) WATER LEVEL MEASUREMENT DEVICE USING LOAD CELL

(75) Inventor: Guy Gonen, Ra'anana (IL)

(73) Assignee: Guy Gonen, Ra'anana (IL)

( * ) Notice: Subject to any disclaimer, the term of this patent is extended or adjusted under 35 U.S.C. 154(b) by 212 days.

(21) Appl. No.: 13/079,824

(22) Filed: Apr. 5, 2011

(65) Prior Publication Data

US 2012/0257881 A1    Oct. 11, 2012

(51) Int. Cl.
| | |
|---|---|
| A47J 27/00 | (2006.01) |
| A47J 31/54 | (2006.01) |
| F24H 1/18 | (2006.01) |
| G01F 23/20 | (2006.01) |
| G01G 21/22 | (2006.01) |
| A47J 31/56 | (2006.01) |

(52) U.S. Cl.
CPC .............. *G01G 21/22* (2013.01); *G01F 23/20* (2013.01); *A47J 31/56* (2013.01)
USPC ............................................ 392/441; 73/296

(58) Field of Classification Search
USPC ........... 392/441; 222/58, 64; 73/296; 99/281, 99/288
See application file for complete search history.

(56) References Cited

U.S. PATENT DOCUMENTS

| | | | |
|---|---|---|---|
| 2,680,802 A | | 6/1954 | Bremer |
| 5,850,757 A | * | 12/1998 | Wierenga ........................ 73/296 |
| 6,067,894 A | | 5/2000 | Eugster |
| 6,741,180 B2 | * | 5/2004 | Lassota ......................... 340/622 |
| 2005/0001047 A1 | * | 1/2005 | Chamberlain, Jr. ............. 237/19 |
| 2006/0037481 A1 | | 2/2006 | Bicht |
| 2010/0183778 A1 | | 7/2010 | Kreutzer Orent |
| 2011/0058797 A1 | | 3/2011 | Servidio |
| 2012/0067920 A1 | * | 3/2012 | Veltrop et al. .................... 222/1 |

* cited by examiner

*Primary Examiner* — Dana Ross
*Assistant Examiner* — Lindsey C Teaters
(74) *Attorney, Agent, or Firm* — Mark M. Friedman (57) ABSTRACT

An assembly for measuring the water level of a food industry machine has a water tank holding water to be heated, a load cell installed underneath the water tank so that a weight of the water tank holding the water impinges on a strain gauge of the load cell, a controller for receiving an electric signal from the load cell proportionate to a weight of the water tank plus the water in the water tank and converting the weight to a water level of the water tank based on a pre-determined formula and a display structure for continuously displaying a water level of the water in the water tank. The water level measurement device stays dry and free of scale deposits.

18 Claims, 5 Drawing Sheets

FIG. 5 though the water level measurement device is not exposed to the water and thus water should not be a concern.

WATER LEVEL MEASUREMENT DEVICE USING LOAD CELL

FIELD AND BACKGROUND OF THE INVENTION

The present invention relates to apparatuses and methods for coffee-making machines and, more particularly to coffee-making machines that have water level measurement devices using load cells.

Coffee-making machines, a term which is understood to include within it espresso-making machines, require heating water used for making the coffee or espresso. The water used for making espresso or coffee is not filtered water, which would not be suitable for drinking. Accordingly, the water used for making the coffee or espresso is water in which there are a significant amount of dissolved minerals. This may be tap water or it may be bottled water containing minerals.

It is well known that heating water causes at least some of the minerals to precipitate out of solution either through evaporation of the water solvent due to the heat or through precipitation of the solute out of solution as fine particles. In either case, the particles that come out of solution gravitate to the bottom or side of the container holding the solution as sediment. For example, calcium deposits are a common outcome of heating water.

Figure 1:
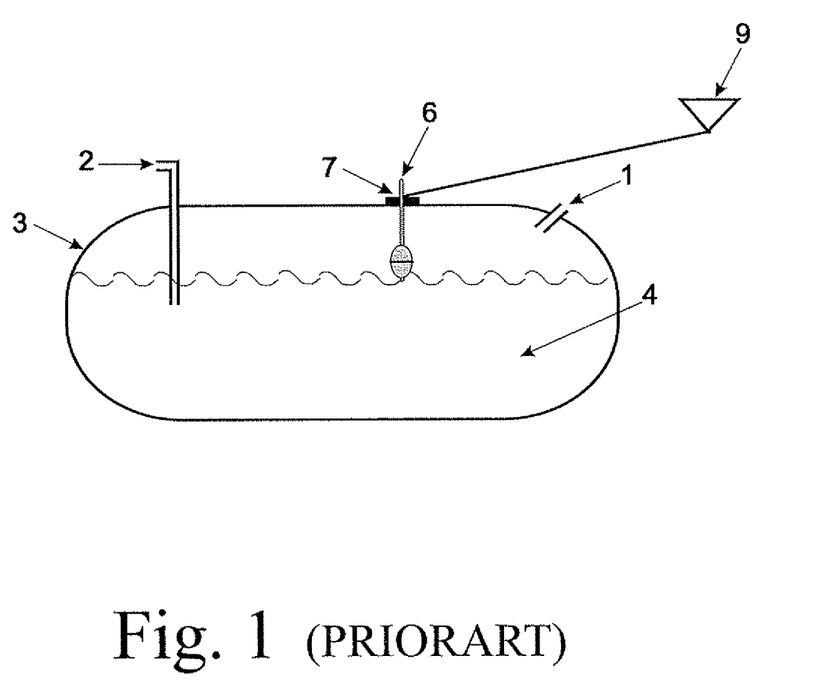
FIG. 1 is a front plan view of a water tank of the prior art having a water level measurement device including a float.

An important component of the coffee making machine is the water level measuring instrument. In the prior art, these are internal gauges that indicates whether the water has reached the fill line—i.e. whether the water tank is full or needs to be filled. In one version seen in FIG. 1, a float 6 extends downward into the water tank 3 having a fluid entrance 1 and a fluid outlet 2. When the level of the water 4 rises to reach the level of the float 6, which extends down to the fill line, the float is impacted by the water which causes the float 6 to go up and activate a tiny magnetic switch 7, sending a YES signal to a controller 9. Otherwise, in other conditions, the switch remains inactivated and a NO signal is being transmitted to the controller. When water in the water tank is heated the calcium and other minerals precipitate and evaporate out of solution and cause scaly calcium and lime to build up on the float.

Figure 2:
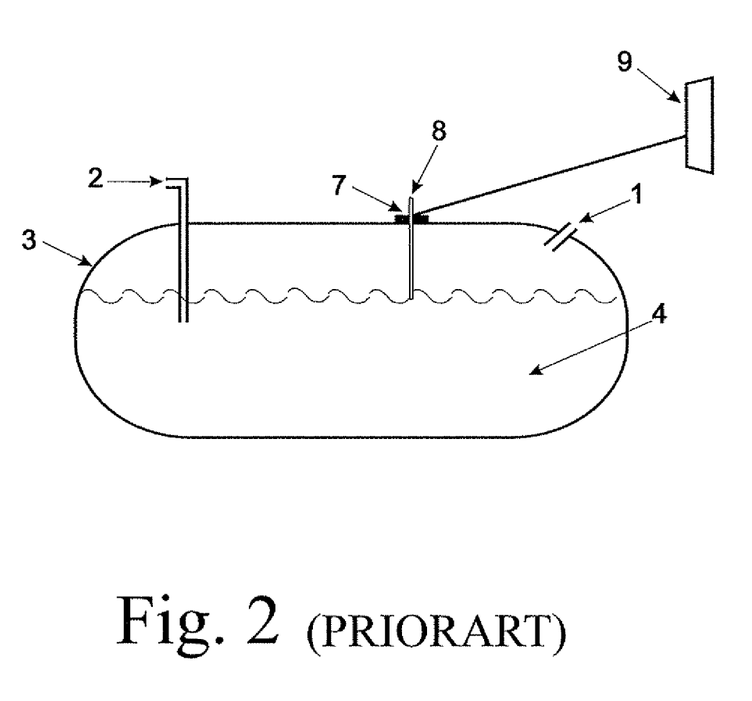
FIG. 2 is a front plan view of a water tank of the prior art containing a water level measurement device including a probe.

In a second type of water level measuring device seen in FIG. 2, an elongated and thin metal probe 8 extends downward into the water tank. When the water level rises to touch the probe, which extends to the fill line, the probe sends a YES signal to the controller. Otherwise, a NO signal is transmitted to the controller.

In both cases, the water level measurement device, or at least part of it, is quickly exposed to the calcium and lime deposits that precipitate or evaporate out of the heated water.

It is well known that calcification and the deposit of lime sediments are a continuing problem for wet water level measurement components and other wet components of coffee-making machines for several reasons. The calcium and lime sticks to everything that touches water. This includes the water level measurement device and other sensors and other critical components. The build-up of scale interferes with the functioning of the water level measuring components and causes it to generate wrong readings that either overstate the water level or understate the water level. In addition, the float gets stuck.

If the water level measuring device gives a false reading that the water level is lower than it actually is, which is what usually happens from scale build up, the real water level will be too high and this causes the tank to keep filling up eventually resulting in overflowing. The water floods the entire machine. It is not uncommon for the malfunctioning water level measuring device to cause such overflowing that the entire premises of the business are flooded. Flooding water might contact electricity and cause a short circuit, shutting down the whole machine and possibly even other machines or appliances connected to the same electricity line or affected by flooding water. Damage can be very expensive to repair and even irreversible.

In addition, if the water level measuring device were to give a false reading that the water level is higher than it actually is, the actual water level will be too low and this will cause overheating, which also damages the coffee making machine, or other machine of the food industry.

As a result of the build-up of scaly deposits on the components of coffee making machines, machines that are supposed to last 10 to 20 years end up lasting 2 to 4 years. Accordingly, equipment replacement costs are astronomical. Labor costs for maintaining these coffee making machines are also high since a certified espresso machine technician is required in order to replace these heating elements. Their work takes several hours and the machine is down during that time, affecting business.

One thing that can be done to try to prevent build-up of lime and calcium on the heating element is to increase the frequency of maintenance checks. Chemicals for cleaning the lime and calcium also cost money. Consequently, increasing the frequency of maintenance checks increases labor costs and generates a significant increase in overall maintenance costs.

Prior attempts to solve the problem of the scale deposits include the use of water softeners that are placed into the water. Water softeners exchange calcium and magnesium ions with twice as many sodium ions. This ion exchange is expensive to maintain, requires a lot of sale to operate and can require a lot of extra water. Environmentalists maintain that water softeners pollute our environment and harm people on salt restricted diets. This has to legislation—at the state or local level—in approximately 34 states of the United States restricting the use of water softeners in sanitary sewage systems. Water softeners may also speed up pipe damage as the more salty water flows through the piping. Approximately two years from now additional legislation is expected to be implemented further restricting use of water softeners.

An additional prior art attempt to solve the problem involves the use of filters in the coffee-making machines. Filters are expensive. In addition, the filters must be maintained properly, however, in order to be effective. In fact, the filters need to be replaced weekly. Applicant's experience in servicing coffee making machines over decades is that filters are simply not maintained properly. They are not replaced when they should be. A common reason, besides laziness, is that there is a frequent labor changeover in the retail outlets that use coffee-making machines and there is a constant shortage of trained personnel able to change the filters.

Another type of water level measuring device is ultrasonic. Although it does not touch water it costs approximately $700, which is much too expensive to be practical to be used to measure the water level in a coffee making machine or other food industry equipment. It is used in large industrial applications such as large scale weight machines, including truck weigh stations.

Applicant has also heard of a company on the Internet calling itself "Scalebusters" that offers a computerized system installed on the incoming water line of a facility. The computer system uses an oscillating electronic field that claims to change the physical size, shape and charge of calcium molecules. Although alleged to be less expensive than water softeners, this computer system is expensive to install and maintain.

There is a compelling need to have a method and apparatus for solving the build-up of lime and calcium deposits from water that affects the water level measuring components and other critical components of coffee-making machines.

SUMMARY OF THE PRESENT INVENTION

One aspect of the present invention is a further aspect of the present invention is directed to an assembly for measuring the water level of a coffee-making machine, comprising a water tank holding water to be heated; a load cell installed underneath the water tank so that a weight of the water tank holding the water impinges on a strain gauge of the load cell; a controller for receiving an electric signal from the load cell proportionate to a weight of the water tank plus the water in the water tank and converting the weight to a water level of the water tank based on a pre-determined formula; and display structure for continuously displaying a water level of the water in the water tank.

A further aspect of the present invention is a method of measuring a water level of water in a machine used in the food industry to provide a food or beverage, the method comprising installing a load cell under a water tank of the machine so that a weight of the water tank holding the water impinges on the load cell; providing a controller to convert a signal from the load cell to a water level of the water in the water tank; and a display structure operationally engaged to the controller continuously displaying the water level.

A still further aspect of the present invention involves an assembly for a machine in which water is heated in a water tank, the assembly comprising a water tank; a water level measurement device including a load cell installed under the water tank so that a weight of the water tank holding the water impinges on a strain gauge of the load cell; a controller for receiving an electric signal from the load cell proportionate to a weight of the water tank plus the water in the water tank and converting the weight to a water level of the water tank based on a pre-determined formula; a display structure for displaying the water level of the water in the water tank; a short wave heating element encased in a heat conducting sleeve, the sleeve crossing the water tank below a fill line, the short wave heating element selected from the group comprising a halogen lamp and an infra red lamp, the short wave heating element connected to a controller that determines when and for how long the short wave heating element is actuated.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a food industry machine such as a coffee making machine having a small water tank/boiler that utilizes a load cell as a water level measurement device. The combined weight of the water in the water tank plus the water tank is continuously sensed by a strain gauge of the load cell installed under the water tank and translated by a controller into a water level of the water tank. The water level measurement device is thereby kept dry and free of lime or scaly build-up.

In contrast to prior art coffee making machines in which the water level measurement device is in contact with the water in the water tank and accumulates scale from lime or calcium during ordinary use, the water level measurement device of the present invention and the assemblies used for such machines may utilize a water level measurement device that may be kept dry by being outside the water tank. Accordingly, no build-up of lime or calcium may occur on the water level measurement device, a critical component during use of the machine. In further contrast to the prior art, in which the conventional coffee making machine uses a water level measurement device that is heavily affected by lime scale and constantly breaking down from lime deposits or other scale, the coffee making machine of the present invention may break down much less frequently. In further contrast to the prior art coffee-making machines in which the water level measurement device needs constant maintenance, the coffee-making machine of the present invention including the assembly of the present invention, may be much more reliable and have a higher lifetime expectancy. It may also not need nearly as much maintenance since the external load cell is not affected by water, temperature, etc and this makes its long term cost significantly less compared to the private machines that utilize internal water gauges. In still further contrast to coffee making machines of the prior art, wherein when the water level measurement device gives a binary reading (i.e. full or not full), the water level measurement device of the present invention may provide a more accurate water level measurement reading by providing a continuous real time measurement of water level in the water tank over a range of values (all possible values from empty to completely full). The controller may convert the weight of the water plus the weight of the tank into a reading of the water level. Accordingly, using the present invention not only is the fill line replenished when necessary, but by tracking actual water levels, it is possible to identify problems and deviations when troubleshooting the coffee making machine. Accordingly, in contrast to the prior art machines, the continuous real time measurement of the water level may identify malfunctions and false water level readings, thereby allowing a proper troubleshooting response in real time before the problem becomes worse. In further contrast to the prior art coffee making machines, which may last only two to four years, the coffee making machine of the present invention or which utilizes an assembly of the present invention regarding the water level measurement level and which may also utilize a semi-external heating element that is kept dry, may last ten to twenty years. In further contrast to prior art espresso-making machines, in which flooding leading to short circuits that shut down the whole machine and sometimes other machines affected by flooding, may be a common outgrowth of the malfunctioning of the water level measurement device that has accumulated lime scale and calcium scale, the coffee making machine having the external load cell of the present invention may not suffer from flooding or short circuiting, and the resulting damage and disabling effects.

The principles and operation of a water level measurement device using a load cell in a food industry machine to have dry critical components, according to the present invention may be better understood with reference to the drawings and the accompanying description.

Figure 3:
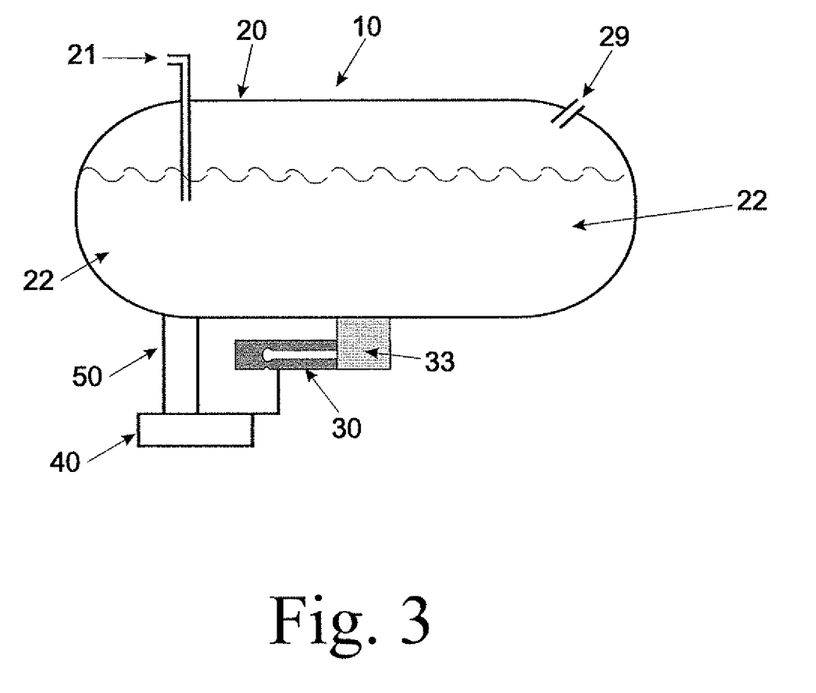
FIG. 3 is a front plan view of a water tank and water measurement level device, in accordance with a further embodiment of the present invention.

As seen from FIG. 3, an assembly 10 for a coffee making machine is for measuring the water level of the coffee-making machine. Assembly 10 may comprise a water tank 20 holding water 22 to be heated and having a water inlet 21 and a water outlet 29. A load cell 30 may be installed underneath the water tank 20 so that a weight of the water tank 20 holding the water may constitute a force that may be converted to a an electric signal. For example, if the load cell 30 is a strain gauge load cell, the weight of the water tank plus water may constitute a force that impinges on a strain gauge 33 of the load cell 30. Although load cell 30 of assembly 10 may take other forms (not shown), load cell 30 may be suitable for weights common to water tanks 20 used for food industry machines.

Load cell 30 may have no components that are in contact with water from the water tank 20. For example, load cell 30 utilizes no probe or float or other components that is in contact with water 22 of water tank 20. In a preferred embodiment, load cell 20 does not touch and has no components that touch water, including water other than water 22 in water tank 20. Moreover, load cell 20 may have no components or parts that are in flow communication with steam exiting water tank 20, and in a preferred embodiment load cell 30 is not in contact with any steam or any fluid other than water.

In certain unusual embodiments, load cell 30 may include multiple load cells, for example a second load cell (not shown) that operates as a backup for a first load cell 30. Strain gauge 33 may also, if necessary include more than one actual strain gauge.

The assembly 10 and method of the present invention may be useful for machines, such as those in the food industry, that have relatively small water tanks. For example, the water tank 20 in assembly 10 may have a volume of less than twenty gallons. In another version, the water tank 20 may have a volume of less than fifteen gallons, or less than 12 gallons, or less than 10 gallons. For example, assembly 10 may be utilized in a coffee making machine. Such a coffee making machine may for example be an espresso making machine.

Assembly 10 may include a controller 40 for receiving an electric signal from the load cell 30 proportionate to, representing or reflecting a weight of the water tank plus the water in the water tank. The controller 40 may also be for converting that signal received from the load cell 30 to a water level of the water tank 20 based on a pre-determined formula. For example, the formula may take into consideration that the weight of the water tank when it is empty is known. Consequently, the known weight of the water when empty may be deducted from the reading of the combined weight of the tank and water contents. This represents the weight of the water in the tank. The formula may further consider the density of water, which is known at various temperatures. Controller 40 may either may estimates of the density based on assumptions of the temperature or may be operatively engaged to a thermometer (which is some embodiments may be considered part of controller 40). Based on this calculation of density, controller 40 may use a predetermined formula to convert the weight of the water to a volume of water. Moreover, since the shape of the water tank is also known, its water levels may correlate with known water volume levels. Accordingly, controller 40 may use a pre-defined formula to convert the combined weight of the water tank and of the water in it to a parameter representing the water level in the water tank.

Load cell 30 may provide continuous and accurate measurement to controller 40 of actual water quantity and water level in water tank 20. Accordingly, assembly 10 may also include a display structure 50 for continuously displaying a water level of the water 22 in water tank 20. The continuity of the display of display structure 50 need not mean that the display occurs 24 hours a day and 7 days a week or even necessarily during all times that the machine, for example a coffee making machine, is turned on. The display structure 50 may have an Off mode during which the display is inactive or not fully active. Display structure 50 may be part of controller 40 or may be operatively engaged to controller 40.

The water tank 20 may have a fill line. Display structure 50 may also display water level information in regard to the fill line, for example by displaying a binary function as to whether the water level in the water tank 20 is up to the fill line or not.

In other embodiments, display structure 50 may display other information as to the water level. For example, a coffee making machine may make different kinds of coffee. There could be scenarios in which the heating element is maintained in the "On" position and the water level in the machine has an impact on the quality of the espresso or other type of coffee or on the type of coffee that is being prepared. Display structure 50 may in this case display information concerning a type of coffee suitable for the particular water level extant in the water tank. In another example, another component may be placed in the water tank (for example encased in a sleeve) and the display structure may provide information as to whether the water level reaches that other component. In still another example, there may be machines in which the water level impacts the functioning of other components. In that case, the display structure 50 may display information, such as a binary function, as to whether the level of water in the water tank 20 is at a level that affects the functioning of such other component. Accordingly, the content of the display of display structure 50 is not necessarily limited to whether the tank is full.

Display structure 50 may display the water level of the water tank 20 (or provide other information) in various forms. Non-limiting examples of the various forms utilized by display structure 50 may include a numerical form, word form, or a graphic form, such as a picture or schematic of a water level. The present invention also contemplates scenarios in which display structure 50 displays water level information in other forms, such as movement of a component such as a lever. In this scenario, when the water tank's water level reaches the fill line or some other pre-defined level, a small lever, for example a small lever outside the water tank, may move or rotate to an "Up" position (from a "Down" position) and may thereby convey water quantity information without a user having to look at an LCD screen. In still other scenarios, display structure may emit auditory or even olfactory stimuli to convey information. Furthermore, any of these scenarios may be used alone or in combination and may be utilized in both assembly 10 and method 100.

Figure 5:
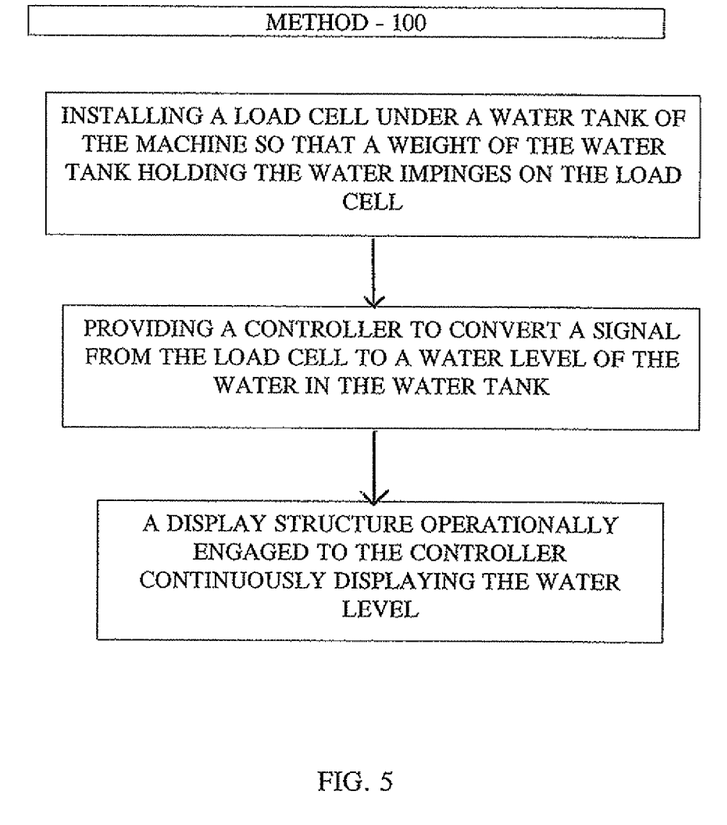
FIG. 5 is a flow chart showing a method in accordance with one embodiment of the present invention.

As seen from FIG. 5, the present invention may also be expressed as a method 100 of measuring a water level of water in a machine used in the food industry (for example a coffee making machine) to provide a food or beverage. Method 100 may include a step 110 of installing a load cell under a water tank of the machine so that a weight of the water tank holding the water impinges on a the load cell. If the load cell is a strain gauge load cell, the weight of the water may impinge on a strain gauge of the load cell. Method 100 may also include a further step of providing a controller, or of using a controller, that converts a signal from the load cell to a a water level of the water in the water tank. Method 100 may also include a step 130 of a display structure operationally engaged to the controller continuously displaying the water level. In some versions of method 100, there may also be a step of displaying an actual water level regardless of whether the actual water level is at a fill line of the water tank. The load cell, controller and display structure may be kept free of contact with water from the water tank and free of any build-up of scaly lime or calcium deposits.

Figure 4:
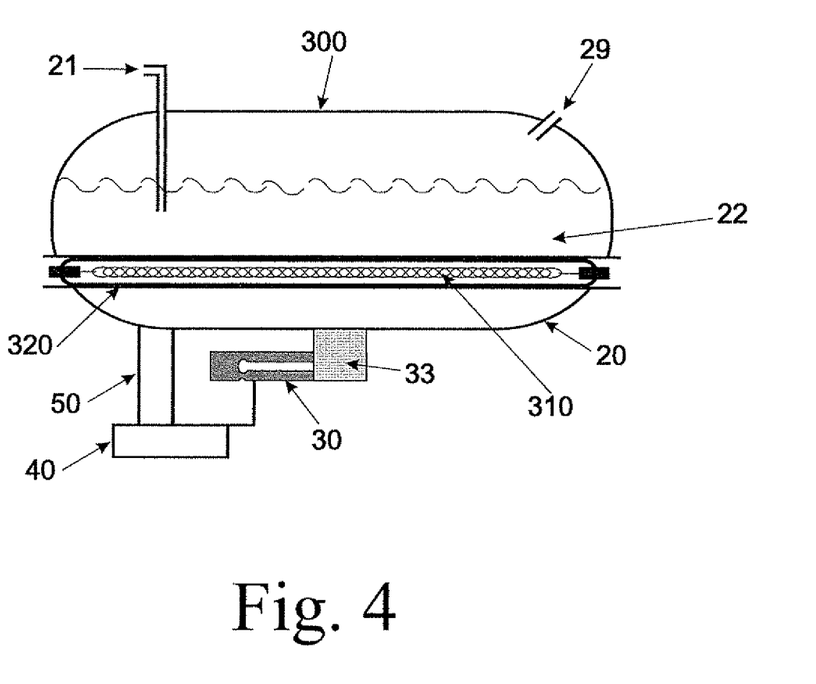
FIG. 4 is a front plan view of a water tank and water measurement level device also showing a dry heating element, in accordance with one embodiment of the present invention.

As shown in FIG. 4, in order to make the machine even less likely to malfunction from scaly deposits, in one version, the heating element of the coffee making machine (or other machine) may also be such that it is maintained in a dry state during operation of the machine. For example, the heating element may be such as described in U.S. patent application Ser. No. 13/041,459 (Coffee-Making Machine With Semi-External Halogen or Infra Red Heating Element) filed by Applicant on Mar. 7, 2011, which is incorporated herein by reference. Accordingly, the heating element of assembly 100 may be a semi-external heating element in which the heating element is within the volume of the water tank but is nonetheless not in contact with water in the water tank, for example by being encased in a heat conducting sleeve within the water tank.

In that case, the present invention may be described as an assembly 100 for a machine in which water is heated in a water tank, where the assembly 100 may comprise a water tank and a water level measurement device that may include a load cell installed under the water tank so that a weight of the water tank holding the water impinges on a strain gauge of the load cell. Further, assembly 100 may also include a controller 40 for receiving an electric signal from the load cell 30 proportionate to a weight of the water tank 20 plus the water in the water tank 20 and converting the weight to a water level of the water tank based on a pre-determined formula.

Assembly 300 may further comprise a "short wave heating element" 310 ("short wave heating element" being defined to mean either a halogen lamp or an infra red lamp regardless of the wavelength light utilized) that may be encased in a heat conducting sleeve 320 such as a heat conducting sleeve. The sleeve 320 may cross water tank 20 below a fill line. In this case cross means cross entirely the length of the water tank or cross at least two-thirds of the length or cross enough to rapidly heat the water in the water tank when the halogen lamp or infra red lamp is actuated by controller 40. Sleeve 320 may preferably be situated below a midpoint of the height of an inside of the water tank and may certainly be situated below the fill line.

Assembly 300 also may comprise a display structure 50 for displaying the water level of the water in the water tank. The display structure 50 of assembly 300 may also display whether the water in the water tank reaches a fill line and may also display whether the water level in the water tank reaches the sleeve 320. "Reaches the sleeve" may mean reaches a bottom of the sleeve or in other cases reaches a top of the sleeve or in other cases reaches a part of the sleeve. Sleeve 320 should be kept underwater for efficiency reasons (heat rises).

The short wave heating element 310 is defined to be either a halogen lamp or an infra red lamp and is not necessarily limited to the short range of the light spectrum. The short range heating element may be connected to a controller (which may be controller 40) that determines when and for how long the short wave heating element is actuated.

Heat conducting sleeve 320 shall be defined to mean a metal sleeve and shall be defined to also mean a non-metal sleeve that has a high thermal conductivity. A high thermal conductivity shall be understood to mean, in units of Btu/(hr ° F. ft), at least 15, or at least 40 or in more preferred embodiments at least 100 or at least 150 or at least 200. Accordingly, heat conducting sleeve 320 includes a sleeve made of graphene, a recently discovered strong carbon material having a very high thermal conductivity.

"Water containing minerals" means ordinary tap water or water that is sold in bottles and that may contain minerals such as mineral water. It does not include water sold in bottles and specifically sold as "filtered water" where the minerals have been removed. Water containing minerals is suitable for use in making coffee or espresso.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An assembly for measuring the water level of a coffee-making machine, comprising:
    a water tank holding stationary water to be heated;
    a load cell installed underneath the water tank so that a weight of the water tank holding the water impinges on a strain gauge of the load cell; and
    one or more controllers for receiving an electric signal from the load cell proportionate to a weight of the water tank plus the water in the water tank and converting the signal to a water level of the water tank based on a pre-determined formula,
    a short wave heating element encased in a heat conducting sleeve below a water fill line, the short wave heating element kept dry and not in contact with water inside the sleeve or water inside the water tank.

2. The assembly of claim 1, wherein the controller includes a thermometer.

3. The assembly of claim 1, wherein the one or more controllers are also for outputting the water level.

4. The assembly of claim 1, wherein the one or more controllers are configured to output the water level to a display structure.

5. The assembly of claim 1, wherein the load, cell does not include any components that are in contact with water from the water tank.

6. The assembly of claim 1, wherein the coffee making machine is an espresso making machine.

7. The assembly of claim 1, wherein the load cell and controller are not in contact with the water.

8. The assembly of claim 1, wherein the short wave heating element connected to the one or more controllers that determines when and for how long the short wave heating element is actuated.

9. The assembly of claim 8, wherein the sleeve is below a midpoint of a height of an inside of the water tank.

10. The assembly of claim 8, wherein the short wave heating element selected from the group comprising a halogen lamp and an infra red lamp.

11. The assembly of claim 8, further comprising a display structure for displaying whether the water in the water tank reaches a fill line and for displaying whether the water in the water tank reaches the sleeve.

12. The assembly of claim 11, wherein the water reaches the sleeve means the water reaches a bottom of the sleeve.

13. The assembly of claim 8, wherein the sleeve crosses at least two-thirds of a length of the entire water tank.

14. The assembly of claim 8, wherein the short wave heating element is a halogen heating element.

15. The assembly of claim 8, further comprising a display structure that continuously displays the water level.

16. The assembly of claim 8, further comprising a display structure for displaying information concerning which one or more types among several different types of coffee are suitable to be prepared by the coffee-making machine at the current water level of the water tank, one of the several different types of coffee comprising espresso.

17. The assembly of claim 1, further comprising a display structure for displaying information concerning which one or more types among several different types of coffee are suitable to be prepared by the coffee-making machine at the current water level of the water tank, one of the several different types of coffee comprising espresso.

18. The assembly of claim 1, wherein the heated water flows to a pod/capsule or espresso handle when the heated water flows out of the water tank and wherein the sleeve crosses the water tank.

* * * * *